(12) United States Patent
Dudar

(10) Patent No.: US 10,464,408 B2
(45) Date of Patent: Nov. 5, 2019

(54) SYSTEM AND METHODS FOR ACTIVE ENGINE MOUNT DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/617,584

(22) Filed: Jun. 8, 2017

(65) Prior Publication Data

US 2018/0354353 A1 Dec. 13, 2018

(51) Int. Cl.
*B60K 5/12* (2006.01)
*B60H 1/32* (2006.01)
*B60T 8/176* (2006.01)
*B60W 10/06* (2006.01)
*B60W 10/08* (2006.01)
*B60W 10/18* (2012.01)
*B60W 10/184* (2012.01)
*B60W 20/50* (2016.01)
(Continued)

(52) U.S. Cl.
CPC ......... *B60K 5/1283* (2013.01); *B60H 1/3205* (2013.01); *B60K 5/1208* (2013.01); *B60T 8/176* (2013.01); *B60W 10/06* (2013.01); *B60W 10/08* (2013.01); *B60W 10/182* (2013.01); *B60W 10/184* (2013.01); *B60W 20/50* (2013.01); *F02D 41/0002* (2013.01); *F02D 41/0087* (2013.01); *F02D 41/021* (2013.01); *F02D 41/04* (2013.01); *F02D 41/38* (2013.01); *F02P 5/045* (2013.01); *F16F 13/10* (2013.01); *G01M 17/007* (2013.01); *G07C 5/0816* (2013.01); *G07C 5/0825* (2013.01); *B60K 5/04* (2013.01); *F02D 41/107* (2013.01); *F02D 2041/389* (2013.01); *F02D 2250/24* (2013.01); *F02P 5/00* (2013.01); *F16F 13/26* (2013.01); *G01F 23/30* (2013.01)

(58) Field of Classification Search
CPC ... B60W 20/50; F02D 41/0087; B60K 5/1208
See application file for complete search history.

(56) References Cited

U.S. PATENT DOCUMENTS 5,313,407 A 5/1994 Tiernan et al.
5,939,625 A * 8/1999 Torii ........................ B60T 8/885
267/140.11
(Continued)

OTHER PUBLICATIONS

Dudar, A., "Systems and Methods for Active Engine Mount Diagnostics," U.S. Appl. No. 15/351,314, filed Nov. 14, 2016, 58 pages.
Dudar, A., "Systems and Methods for Active Engine Mount Diagnostics," U.S. Appl. No. 15/479,180, filed Apr. 4, 2017, 68 pages.

*Primary Examiner* — Imran K Mustafa
(74) *Attorney, Agent, or Firm* — Geoffrey Brumbaugh; McCoy Russell LLP

(57) ABSTRACT

Methods and systems are provided for identifying degradation of active engine mounts coupled to a vehicle engine. By correlating the monitored vibrational pattern to a selected active mounts operating mode, the conditions of active engine mounts may be distinguished. Timely diagnosis of active engine mounts may improve active engine mount health and prevent noise, vibration, and harshness (NVH) issues.

20 Claims, 7 Drawing Sheets

(51) Int. Cl.

| | |
|---|---|
| *F02D 41/00* | (2006.01) |
| *F02D 41/04* | (2006.01) |
| *F02D 41/38* | (2006.01) |
| *F02P 5/04* | (2006.01) |
| *F16F 13/10* | (2006.01) |
| *G01M 17/007* | (2006.01) |
| *G07C 5/08* | (2006.01) |
| *F02D 41/02* | (2006.01) |
| *F16F 13/26* | (2006.01) |
| *G01F 23/30* | (2006.01) |
| *F02D 41/10* | (2006.01) |
| *F02P 5/00* | (2006.01) |
| *B60K 5/04* | (2006.01) |

(56) References Cited

U.S. PATENT DOCUMENTS

| | | | |
|---|---|---|---|
| 6,361,031 | B1 | 3/2002 | Shores et al. |
| 8,296,103 | B2 | 10/2012 | Son et al. |
| 8,347,856 | B2 | 1/2013 | Leone et al. |
| 9,365,218 | B2 | 6/2016 | Pallett et al. |
| 2010/0082274 | A1* | 4/2010 | Son .................. G01H 1/00 702/56 |
| 2012/0049424 | A1 | 3/2012 | Bradshaw et al. |
| 2015/0075267 | A1 | 3/2015 | Sweppy et al. |
| 2015/0100221 | A1* | 4/2015 | Routledge ........ F01N 1/165 701/111 |
| 2017/0076514 | A1* | 3/2017 | Valeri ............... G05B 23/00 |

\* cited by examiner

Recorded vibration patterns above threshold?

| | 1st mode | 2nd mode | 1st mode | Diagnosis |
|---|---|---|---|---|
| A | No | Yes | No | Active mounts functioning as desired |
| B | No | No | No | Active mounts stuck in first mode |
| C | Yes | Yes | Yes | Active mounts stuck in second mode |

630  640  650

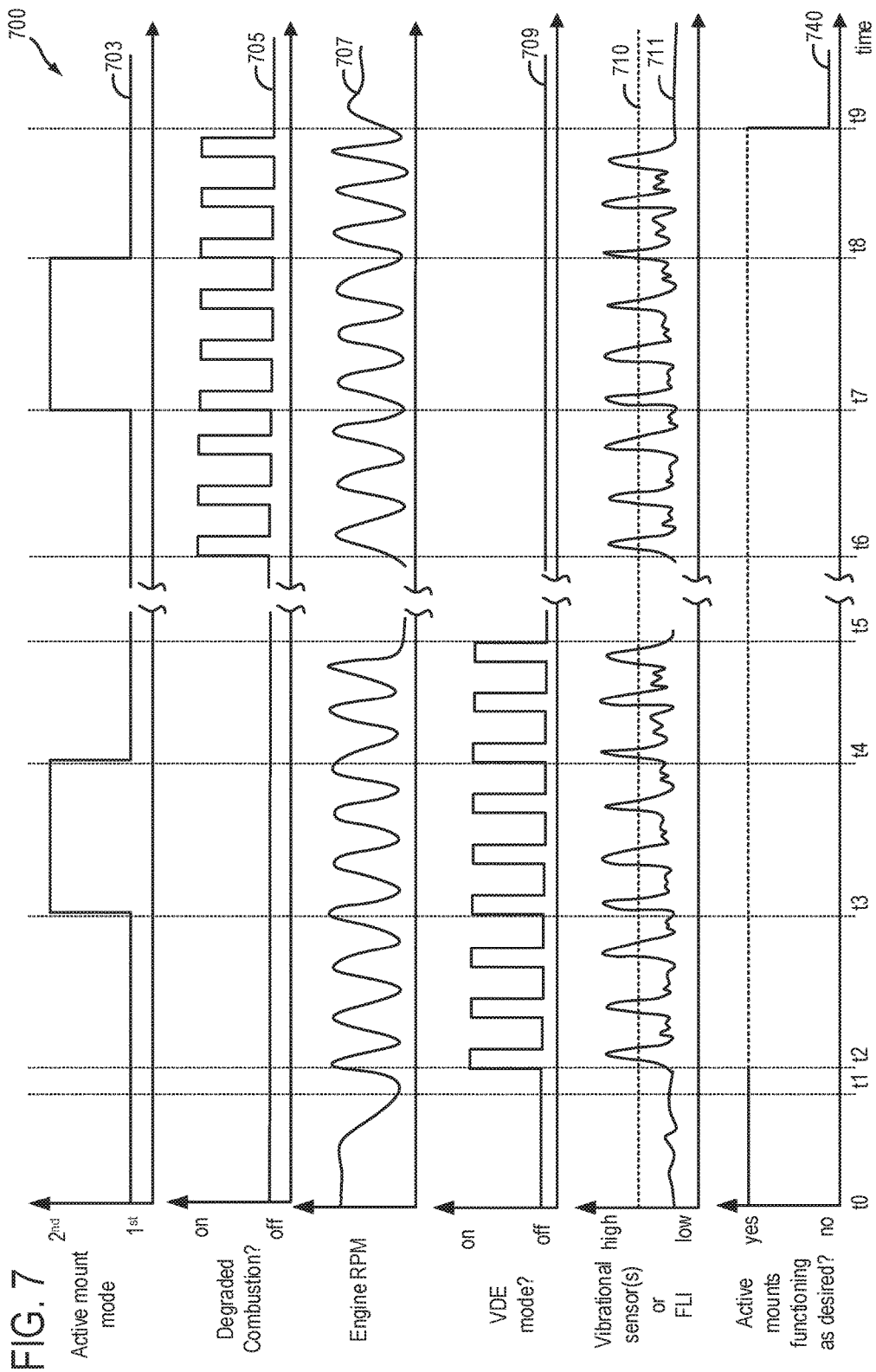

SYSTEM AND METHODS FOR ACTIVE ENGINE MOUNT DIAGNOSTICS

FIELD

The present description relates generally to methods and systems for diagnosing an active engine mount coupled to an engine.

BACKGROUND/SUMMARY

Engines historically have had solid rubber mounts to isolate engine vibration from the vehicle cabin and chassis, where the rubber naturally absorbed vibrations from the engine. However, in performance and high end cars, if rubber is too compliant, then certain vehicle maneuvers may cause high loads, and this may stress joints in the vehicle, for example in the exhaust system. Hence, tunable active engine mounts have been developed that may be controlled to change dampening characteristics depending on engine load.

As an example, the active engine mounts may be configured to be soft (e.g. dampening mode) at engine idle to absorb undesired vibrations. However, at higher engine speeds, the active engine mounts may be configured to stiffen (e.g. stiffening mode), to limit undesired engine motion, which may prevent stress on exhaust joints, for example. Accordingly, active engine mounts may achieve low noise, vibration, and harshness (NVH) at idle, and may further reduce NVH and prevent undesired stress at high loads. Overtime, the active engine mounts may degrade due to active engine mount aging, for example. As a result, the undesired engine vibrations may not be absorbed as effectively. Further, if the undesired vibration is not appropriately absorbed/dampen, engine performance may be reduced, leading to reduced fuel economy and overall decrease in engine efficiency.

The inventors herein have recognized these issues, and have developed systems and methods to at least partially address the above issues. In one example, the conditions of active engine mounts may be monitored and diagnosed by a method for a vehicle comprising: spinning an engine, which drives the vehicle, unfueled using torque from an electric motor while selectively deactivating engine valves and/or shutting-off fueling to an engine cylinder while adjusting an active engine mount responsive to a request to monitor the active engine mount; and indicating degradation of the active engine mount based on an amount of vehicle chassis vibration during the spinning. In this way, active engine mounts degradation may be reliably identified and addressed in a timely manner.

As an example, an autonomous or hybrid vehicle system may include an engine and a transmission coupled to vehicle chassis via active engine mounts. The active engine mounts may be vacuum-regulated engine mounts that counter engine vibration by operating in a first, dampening mode during engine idle condition and operating in a second, stiffening mode at higher engine speed/load condition to reduce intensity of engine vibration. In particular, during vehicle static condition, the vehicle/engine vibration may be induced via a non-combustion mode or a degraded combustion mode. Inducing vehicle vibration via non-combustion mode may include spinning an engine unfueled while selectively deactivating valves of engine cylinders (i.e. selectively activating variable displacement engine (VDE) mode in a periodic fashion). Alternatively, vehicle vibration may be induced via shutting off fueling to one or more preselected engine cylinders to stimulate a degraded combustion events (i.e. misfire). A controller may then adjust the active engine mounts to operate in a first, dampening mode or a second, stiffening mode for a duration during the inducing, and at the same time, engine vibration patterns may be monitored via one or more vibrational sensors over the duration. If the monitored vibration patterns are within a threshold when operating in the first mode and above a threshold when operating in the second mode, then the active engine mounts are indicated to be functioning as desired. However, if the monitored vibration are within a threshold for both operating modes, then it may be inferred that the active engine mounts are stuck in the dampening mode. Alternatively, if the monitored vibrations are above a threshold for both operating modes, then it may be inferred that the active engine mounts are stuck in the stiffening mode.

In this way, active engine mounts may be accurately and reliably diagnosed, enabling engine mounts degradation to be better predicted. The technical effect of adjusting active engine mounts to a selected operating mode while inducing vehicle vibration and monitoring the vibrational pattern following the adjusting is that the actual operating state of the active engine mounts may be better identified. By timely diagnosing active engine mounts, active engine mount health may be improved, reducing undesired NVH-related issues and enabling improved engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows an example look-up table for diagnosing the condition of active engine mounts.

FIG. 7 depicts an example timeline for conducting the active engine mount diagnostic.

DETAILED DESCRIPTION

Figure 1:
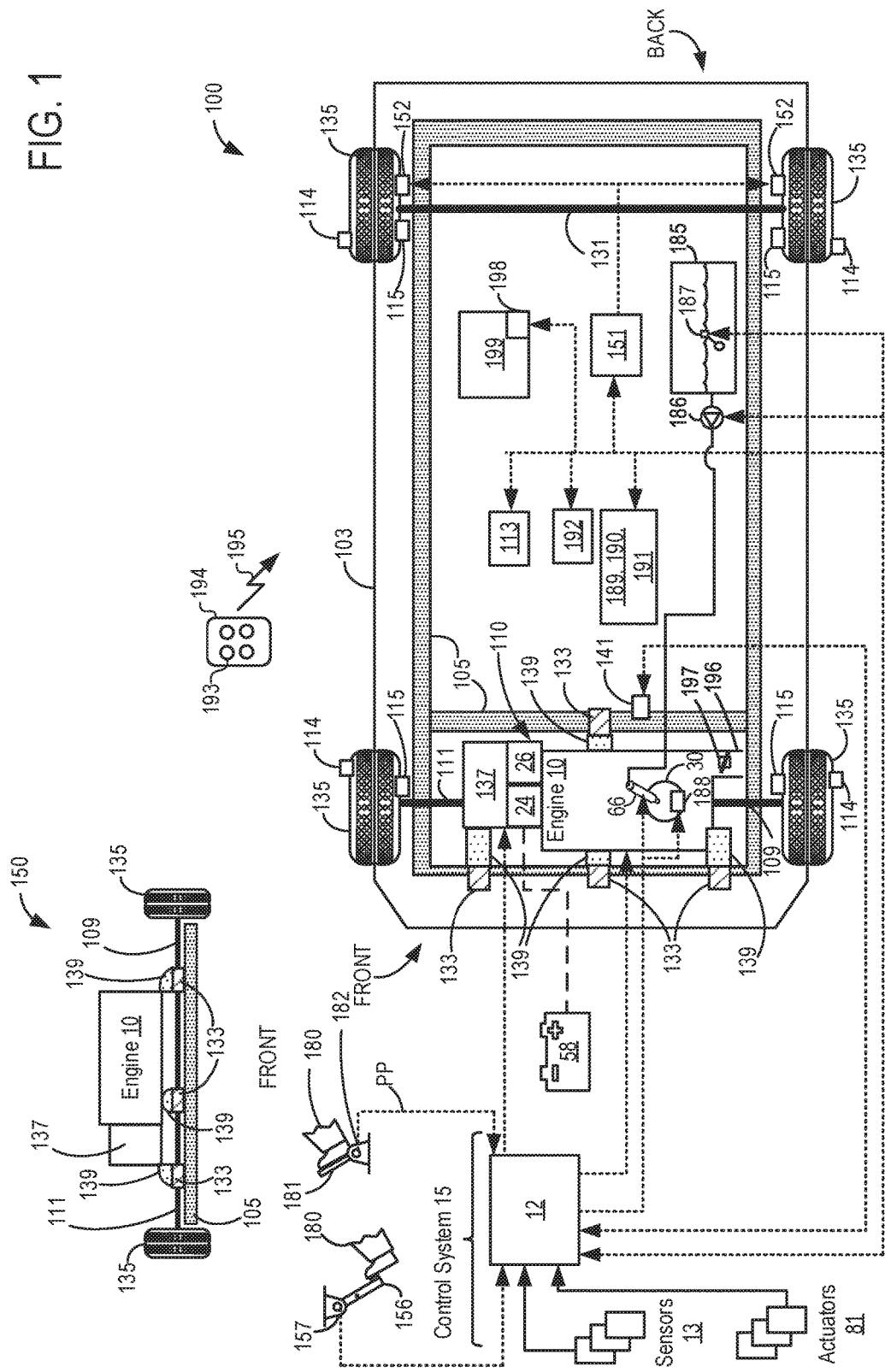
FIG. 1 illustrates an example vehicle powertrain including one or more active engine mounts.
Figure 2:
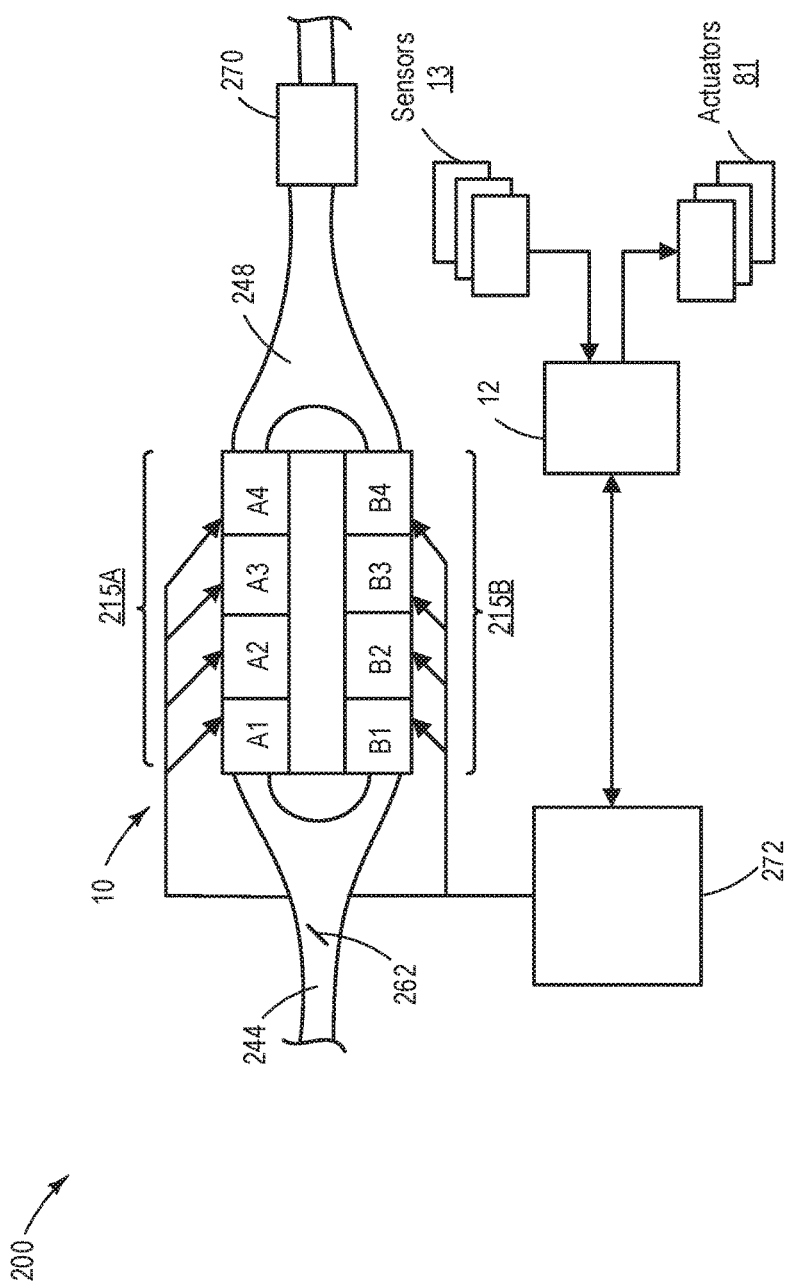
FIG. 2 shows an example schematic layout of a variable displacement engine (VDE) of the vehicle powertrain of FIG. 1.
Figure 3:
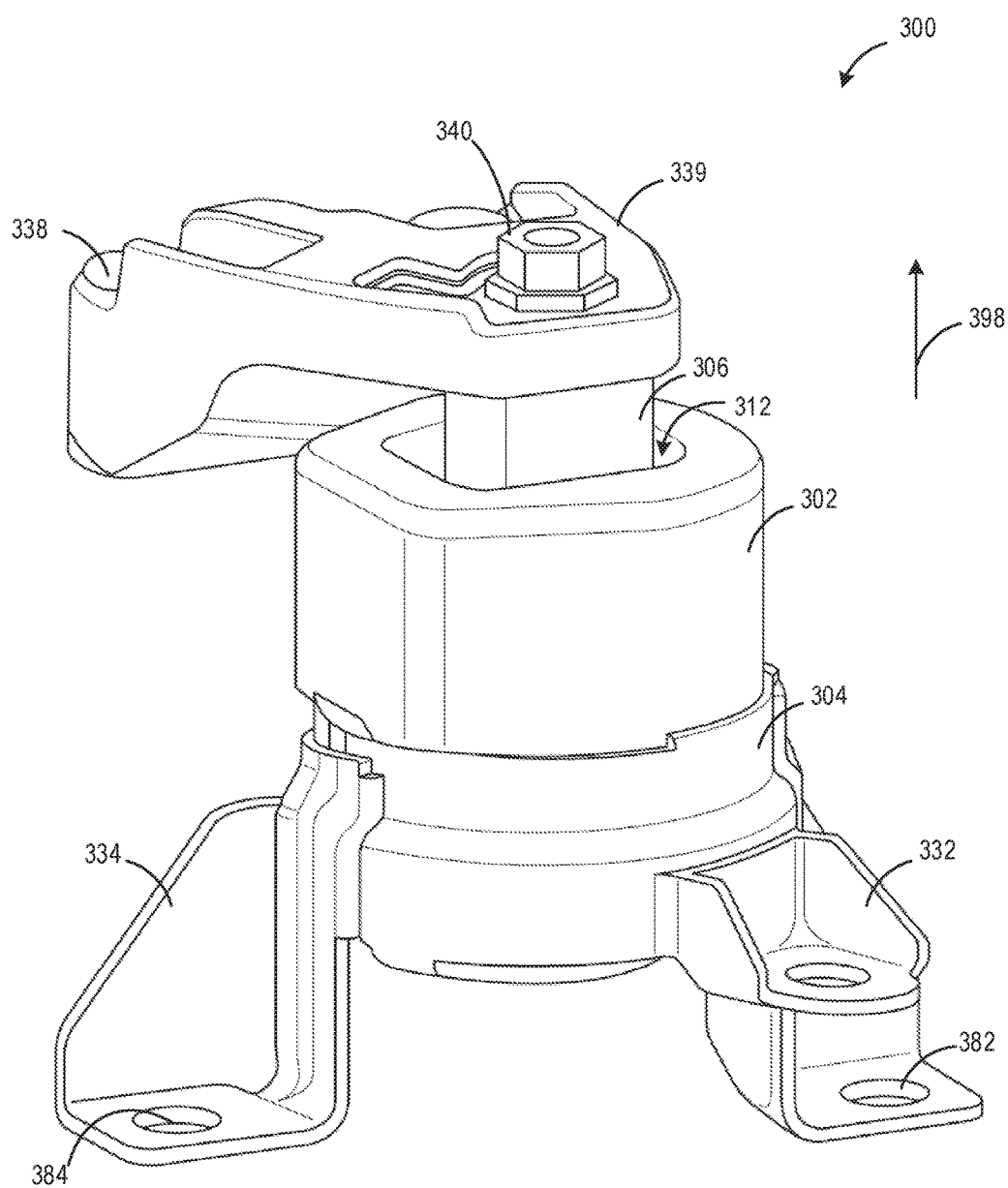
FIG. 3 shows an external view of an example active engine mount coupled to the vehicle powertrain of FIG. 1.
Figure 4:
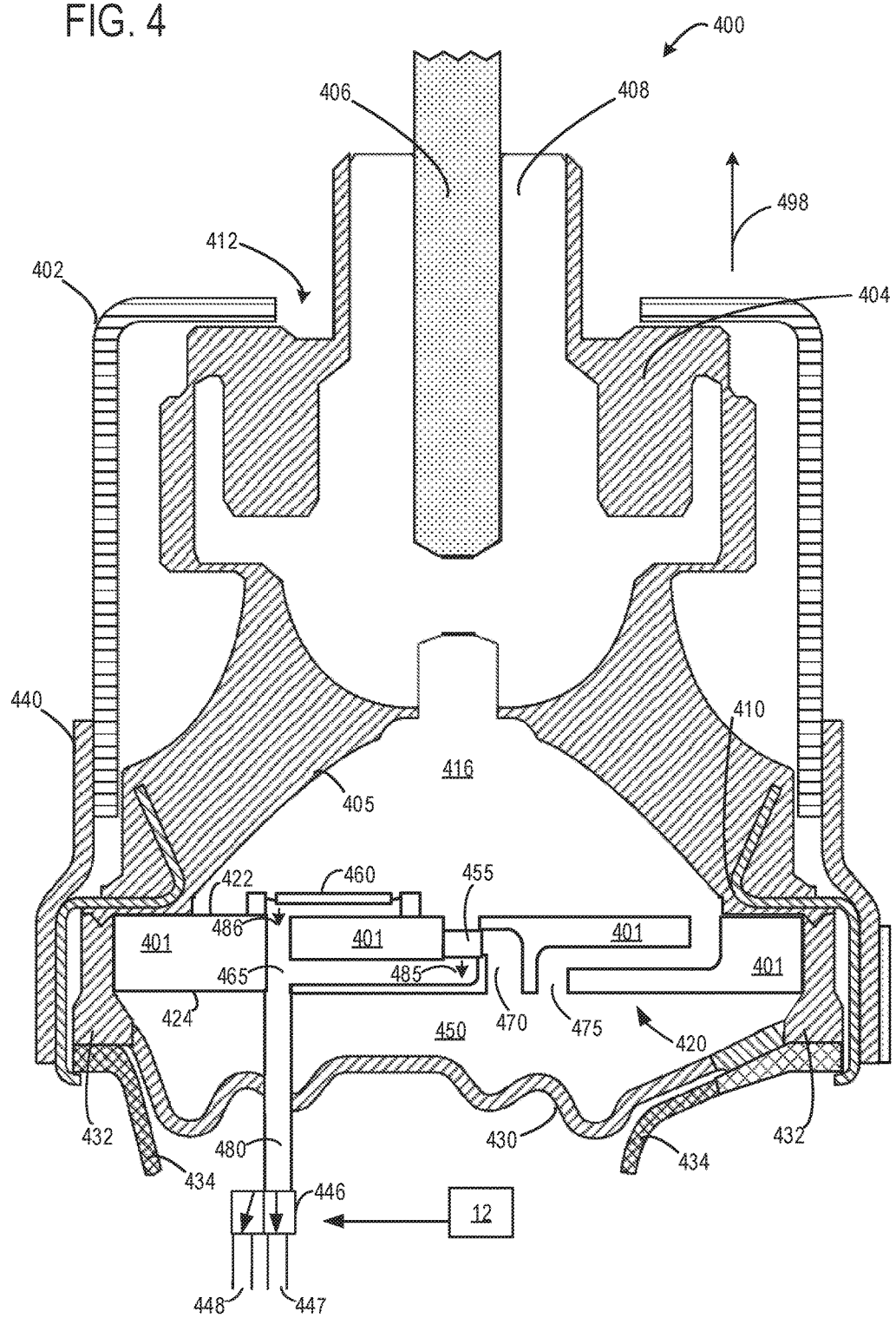
FIG. 4 shows a cross-sectional view of an example active engine mount, including a partitioning structure and decoupler element.

The following description relates to systems and methods for diagnosing active engine mounts of a vehicle, such as the vehicle system of FIG. 1. The vehicle system may include an engine system such as a four-cylinder engine capable of operation in variable displacement engine (VDE) mode, as depicted in FIG. 2. The engine system may be supported in a vehicle by a plurality of active engine mounts that may be adjusted to at least two operating modes, such as to a first, dampening mode and to a second stiffening mode, to isolate undesired noise, vibration, and harshness (NVH) from a vehicle chassis, as shown in FIGS. 3-4. A controller may be configured to perform a control routine, such as the example routine of FIG. 5, to monitor the conditions of active engine mounts of the vehicle. The controller may be further configured to determine whether the active engine mounts are functioning as desired or stuck in one of the operating modes (e.g., dampening or stiffening mode) from a lookup table, such as the lookup table depicted in FIG. 6. A prophetic active engine mount diagnosis is shown with reference to FIG. 7. In this way, by reliably diagnosing active engine mounts, the vehicle noise, vibration, and harshness (NVH) performance may be improved.

Referring to FIG. 1, an example embodiment of a vehicle system 100 is shown from a top view. Vehicle system 100 comprises a vehicle body 103 with a front end, labeled "FRONT", and a back end labeled "BACK." Vehicle system 100 may include a plurality of wheels 135. For example, as shown in FIG. 1, vehicle system 100 may include a first pair of wheels adjacent to the front end of the vehicle and a second pair of wheels adjacent the back end of the vehicle.

In some examples, vehicle system 100 may be a hybrid vehicle system with multiple sources of torque available to one or more vehicle wheels 135. In one example, vehicle system 100 may be a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. In another example, vehicle system 100 may be an autonomously driven car.

In the example shown, vehicle system 100 includes an internal combustion engine, such as engine 10, coupled to transmission 137. Engine 10 and transmission 137 may herein be referred to in combination as a vehicle powertrain 110 or a powertrain 110. The powertrain 110 may be configured in various manners including as a parallel, a series, or a series-parallel hybrid vehicle. It will be appreciated that other vehicle components coupled to one or more of engine and/or transmission 137 may also be included in the vehicle powertrain 110 without departing from the scope of the present invention. For example, engine 10 may include an engine intake 196 and an engine exhaust (not shown). Engine intake may include a throttle 197, for controlling an amount of intake air to engine 10. In one example, throttle 197 may be controlled electronically via a controller, such as controller 12. In another example, throttle 197 may be mechanically coupled to an accelerator pedal 181.

In the depicted example, transmission 137 may be a gearbox, a planetary gear system, or another type of transmission. Transmission 137 may further include an electric generator 24 and an electric motor 26. The electric generator 24 and the electric motor 26 may also be referred to as electric machines as each may operate as either a motor or a generator. Torque is output from transmission 137, for propelling vehicle wheels 135, via power transfer gearing (not shown), a torque output shaft (not shown), and differential-and-axle assembly (not shown).

Generator 24 is driveably connected to electric motor 26 such that each of electric generator 24 and electric motor 26 may be operated using electric energy from an electrical energy storage device, herein depicted as battery 58. In some embodiments, an energy conversion device, such as an inverter, may be coupled between the battery and the motor to convert the DC output of battery into an AC output for use by motor. However, in alternate embodiments, the inverter may be configured in the electric motor. Electric motor 26 may be operated in a regenerative mode, that is, as a generator, to absorb energy from vehicle motion and/or the engine and convert the absorbed kinetic energy to an energy form suitable for storage in battery 58.

Vehicle system 100 is depicted as having a front wheel drive (FWD) transmission where engine 10 drives the front wheels via half shafts 109 and 111. In another embodiment, vehicle system 100 may have a rear wheel drive (RWD) transmission which drives the rear wheels via a driveshaft (not shown) and a differential (not shown) located on rear axle 131. In still other examples, vehicle system 100 may include a four wheel drive transmission.

Engine 10 and transmission 137 may be supported at least partially by frame, or chassis, 105, which in turn may be supported by plurality of wheels 135. As such, vibrations and movements from engine 10 and transmission 137 may be transmitted to frame 105. Frame 105 may also provide support to a body of vehicle system 100 and other internal components such that vibrations from engine operation may be transferred to an interior, or cabin, of vehicle system 100. In order to reduce transmission of vibrations to the interior, or cabin, of vehicle system 100, engine 10 and transmission 137 may be mechanically coupled via a plurality of members 139 to respective active engine mounts 133. As discussed herein, active engine mounts may refer to any type of active engine mount that may change its dampening characteristics. For example, such an active mount may be controlled or adjusted to be relatively soft (e.g., to dampening mode) at engine idle to absorb undesired vibration, but may be controlled or adjusted to stiffen (e.g., to stiffening mode) at higher engine speeds and loads to limit undesired engine motion. As one example, engine manifold vacuum may be selectively applied to an active engine mount in order to change the characteristics of the active engine mount. Such an example will be discussed in greater detail with regard to FIG. 4. Thus, active engine mounts as discussed herein may refer to vacuum-regulated engine mounts, active motor mounts that counter engine vibration by commanding a counter shake to reduce intensity of engine vibration, magneto rheological mounts which may contain small particles of iron suspended in liquid such that when an electric current or magnetic field is applied to the fluid, the iron particles line up and effectively increase viscosity of the fluid, etc.

As depicted, engine 10 and transmission 137 are mechanically coupled at four locations to members 139 and via members 139 to four active engine mounts 133. In other alternate embodiments, a different number of members and active engine mounts may be used, without departing from the scope of the present disclosure.

View 150 depicts a view of vehicle system 100 as observed from the front end of vehicle system 100. Control system 15 including controller 12 may at least partially control engine 10 as well as vehicle system 100. The controller 12 receives signals from the various sensors 13 of FIG. 1 and employs the various actuators 81 of FIG. 1 to adjust engine operation based on the received signals and instructions stored on a memory of the controller. As an example, vehicle system 100 may include sensors dedicated to indicating the occupancy-state of the vehicle, for example seat load cells 189, door sensing technology 190, and/or onboard cameras 191.

In some examples control system 15 may be in communication with a remote engine start receiver 192 (or transceiver) that receives wireless signals 195 from a key fob 194 having a remote start button 193. In other examples (not shown), a remote engine start may be initiated via a cellular telephone, or smartphone based system where a user's cellular telephone sends data to a server and the server communicates with the vehicle to start the engine.

Control system 15 and controller 12 may send control signals to actuators 81 which may include fuel injector 66 coupled to cylinder 30 in addition to other actuators of engine 10 and transmission 137 not depicted at FIG. 1. For illustrative purposes, only one cylinder 30 and one fuel injector 66 are shown. However, it may be understood that engine 10 may include a plurality of cylinders, and a plurality of fuel injectors. In some embodiments, each cylinder of engine 10 may include a spark plug 188 for initiating combustion. Control system 15 may provide an ignition spark to cylinder 30 via spark plug 188 in response to a spark advance signal from a controller, under select operating modes. However, in some embodiments, spark plug 188 may be omitted, such as where engine 10 may initiate combustion by auto-ignition or by injection of fuel as may be the case with some diesel engines. Further, engine 10 may be a multi-cylinder engine capable of operation in variable displacement engine (VDE) mode, as will be described in greater detail with reference to FIG. 2.

Vehicle system 100 may include one or more fuel storage tanks 185 for storing fuel on-board the vehicle. For example, fuel storage tank 185 may store one or more liquid fuels, including but not limited to: gasoline, diesel, and alcohol fuels. In some examples, the fuel may be stored on-board the vehicle as a blend of two or more different fuels. For example, fuel storage tank 185 may be configured to store a blend of gasoline and ethanol (e.g., E10, E85, etc.) or a blend of gasoline and methanol (e.g., M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle, for example.

In some embodiments, control system 15 may receive an indication of the level of fuel stored at fuel storage tank 185 via a fuel level sensor 187, also referred to herein as fuel level indicator (FLI) 187. The level of fuel stored at fuel storage tank 185 (e.g., as identified by the fuel level sensor 187) may be communicated to the vehicle operator, for example, via a fuel gauge or indication in a vehicle instrument panel (not shown).

Fuel storage tank 185 may be coupled to a fuel pump system 186. The fuel pump system 186 may include one or more pumps for pressurizing fuel delivered to the injectors of engine 10, such as the example injector 66 shown. As discussed, while only a single injector 66 is shown, additional injectors are provided for each cylinder. As depicted, fuel level sensor 187 may comprise a float connected to a variable resistor. Alternatively, other types of fuel level sensors may be used.

Controller 12 may receive input data from the various sensors, process the input data, and trigger the actuators in response to the processed input data based on instruction or code programmed therein corresponding to one or more routines. In one example, controller 12 may be a conventional microcomputer which includes: a central processing unit (CPU), an input/output (I/O) ports, a read-only memory (ROM), a random access memory (RAM), a keep alive memory (KAM), and a conventional data bus. Controller 12 may receive various signals from sensors coupled to powertrain 110, including measurement of inducted mass air flow (MAF) from mass air flow sensor (not shown); engine coolant temperature (ECT) from temperature sensor coupled to cooling sleeve (not shown); a profile ignition pickup signal (PIP) from Hall effect sensor (not shown) coupled to crankshaft (not shown); and throttle position TP from throttle position sensor 197 and an absolute Manifold Pressure Signal MAP from sensor (not shown). Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, engine speed sensor may produce a predetermined number of equally spaced pulses every revolution of the crankshaft. The controller 12 may receive signals from the various sensors of FIG. 1 and employs the various actuators of FIG. 1, such as throttle 197, fuel injectors 66, spark plug 188, etc., to adjust engine operation based on the received signals and instructions stored on a memory of the controller.

In another example, engine 10 may be controlled at least partially by control system including controller 12 and by input from a vehicle operator 180, or an autonomous controller via an input device 181. In one example, input device 181 includes an accelerator pedal and an accelerator pedal position sensor 182 for generating a proportional pedal position signal PP. Similarly, control system 15 may receive an indication of an operator requested vehicle braking via a human operator 180, or an autonomous controller. For example, control system 15 may receive sensory feedback from brake pedal position sensor 157 which communicates with brake pedal 156. In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 12 may monitor rotational speed of each wheel, and responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. In still further cases, as will be discussed in detail below, ABS 113 may command an increased brake pressure at one or more wheels in order to conduct an active engine mount test diagnostic procedure. Herein, increasing brake pressure at one or more wheels via ABS 113 may be referred to as activating one or more wheel brakes. For example, ABS 113 may activate one or more wheel brakes in order to stiffen the vehicle frame and couple it mechanically to the engine, to conduct an active engine mount diagnostic routine, as will be elaborated with respect to FIG. 5.

In one example, the autonomous controller may include a user interface device (not shown), a navigation system (not shown), at least one autonomous driving sensor (not shown), and an autonomous mode controller (not shown). The user interface device may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device may be configured to receive user inputs. In some possible approaches, the user interface device may include a touch-sensitive display screen. The navigation system may be configured to determine a current location of the vehicle using, for example, a Global Positioning System (GPS) receiver configured to triangulate the position of the vehicle relative to satellites or terrestrial based transmitter towers. The navigation system may be further configured to develop routes from the current location to a selected destination, as well as display a map and present driving directions to the selected destination via, for example, the user interface device. The autonomous driving sensors may include any number of devices configured to generate signals that help navigate the vehicle. Examples of autonomous driving sensors may include a radar sensor, a lidar sensor, a vision sensor (e.g. a camera), vehicle to vehicle infrastructure networks, or the like. The autonomous driving sensors may enable the vehicle to "see" the roadway and vehicle surroundings, and/or negotiate various obstacles while the vehicle system 100 is operating in autonomous mode. The autonomous driving sensors may be configured to output sensor signals to, for example, the autonomous mode controller.

In another example, the autonomous mode controller may be configured to control one or more subsystems while the vehicle is operating in the autonomous mode. Examples of subsystems that may be controlled by the autonomous mode controller may include a brake subsystem, a suspension subsystem, a steering subsystem, and a powertrain subsystem. The autonomous mode controller may control any one or more of these subsystems by outputting signals to control units associated with subsystems. In one example, the brake subsystem may comprise an anti-lock braking subsystem, configured to apply a braking force to one or more of wheels (e.g. wheels 135). Discussed herein, applying the braking force to one or more of the vehicle wheels may be referred to as activating the brakes. To autonomously control the vehicle, the autonomous mode controller may output appropriate commands to the subsystems. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

Vehicle system 100 may further include an air conditioning (A/C) system 199, which may include an A/C compressor 198. In some examples, the A/C compressor and A/C system may be electronically controlled via, for example, controller 12. However, in other examples, A/C compressor 198 may be mechanically controlled, via, for example, being coupled to an engine crankshaft (not shown).

Vehicle system 100 may further include an electronic parking brake system 151. Electronic parking brake system may be utilized in conjunction with the vehicle controller, to engage, or release, electronic parking brake(s) 152, for example.

With regard to vehicle system 100, noise, vibration, and harshness (NVH) may arise during engine operation, transmission operation, during transitions in engine operating modes, etc. Additionally, NVH may arise as a result of driving over rough (e.g., uneven) surfaces. Active engine mounts 133 may be designed to dampen vehicle noise and vibrations across a broad range of frequencies, or alternatively may be designed to dampen specific ranges of vibrational frequencies. In this way, NVH arising from a number of different sources may each be dampened by a common active engine mount 133.

Active engine mounts 133 may be operatively coupled to controller 12 and upon receiving a signal from controller 12 may adapt their damping characteristics to neutralize vibrations arising from the engine and/or transmission. In one example, changes to damping characteristics may be obtained by active damping via changing effective mount stiffness. In another example, damping characteristics may be varied by active damping via actuated masses that can create a counterforce to a perceived vibration. Herein, active engine mounts may filter vibrations received from the engine and/or transmission, and provide a counterforce that will nullify vibrations that were not filtered. For example, active engine mounts 133 may be controlled via controller 12, to a first configuration, or first mode (e.g., dampening mode), for idle operation, and to a second configuration, or mode (e.g., stiffening mode), for operating at higher engine speeds and loads. As will be discussed in further detail below with regard to FIG. 5, an active engine mount diagnostic routine may be periodically conducted in order to ascertain whether the active engine mounts are functioning as desired.

As described above, FIG. 1 shows only one cylinder of a multi-cylinder engine. As such each cylinder may similarly include its own set of intake/exhaust valves, fuel injector(s), spark plug, etc. Any number of cylinders and a variety of different cylinder configurations may be included in engine 10, e.g., V-6, I-4, I-6, V-12, opposed 4, and other engine types.

Turning now to FIG. 2, a schematic diagram of multi-cylinder engine system 200 capable of operating in variable displacement engine (VDE) mode is shown. Multi-cylinder engine system 200 may include engine 10 of FIG. 1, for example. It will be appreciated that engine system components introduced in FIG. 1 are numbered similarly and not reintroduced.

In the depicted example, engine 10 is a V8 engine with the first cylinder bank 215A and second cylinder bank 215B, each having four cylinders, cylinders A1-A4 in cylinder bank 15A and cylinders B1-B4 in cylinder bank 15B, respectively. Cylinders A1-A4 of cylinder bank 15A and cylinders B1-B4 of cylinder bank 15B may include selectively deactivatable intake valves (not shown) and selectively deactivatable exhaust valves (not shown). The cylinder valves may be deactivated via hydraulically actuated lifters, or via a cam profile switching (CPS) mechanism in which a cam lobe with no lift is used for deactivated valves. Other mechanisms for valve deactivation may also be used. Engine 10 has an intake manifold 244, with throttle 262, and an exhaust manifold 248 coupled to an emission control system 270. Emission control system 270 may include one or more catalysts and air-fuel ratio sensors (not shown).

During selected conditions, such as when the full torque capability of the engine is not needed, one or more cylinders in a first cylinder bank 215A and a second cylinder bank 215B may be selected for deactivation (herein also referred to as a VDE mode of operation). This may include selectively deactivating one or more cylinders on only the first bank 215A, one or more cylinders on only the second bank 215B, or one or more cylinders on each of the first and second bank. The number and identity of cylinders deactivated on each bank may be symmetrical or asymmetrical. Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. In other words, the remaining active cylinders are operated at higher average cylinder loads. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

In one example, based on a drop in torque demand, one or more cylinders may be selectively deactivated. Further, cylinders may be grouped for deactivation based on their position along the engine block, on an engine bank, by ignition firing order, as well as their deactivation history. As one example, cylinders from the different cylinder banks (e.g., cylinder banks 215A and 215B) may be grouped together for deactivation. For example, during a first VDE condition, cylinders A1, B1, A4 and B4 may be deactivated while during a second VDE condition, cylinders A2, B2, A3 and B3 may be deactivated. In an alternate example, the first VDE pattern may contain a different identity and number cylinders than the second VDE pattern.

Engine 10 may operate on a plurality of substances, which may be delivered via fuel system 272. Engine 10 may be controlled at least partially by a control system including controller 12 (similar to controller 12 of FIG. 1). Controller 12 may receive various signals from sensors 13 (similar to sensors 13 of FIG. 1) coupled to engine 10, and send control signals to various actuators 81 (similar to sensors 81 of FIG. 1) coupled to the engine and/or vehicle. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

Turning now to FIG. 3, an external view of an example active engine mount 300 is shown. It may be understood that such an example is meant to be illustrative, and is not meant to be limiting. Active engine mount 300 may be an example of active engine mount 133 shown within vehicle system 100 of FIG. 1. When configured in a vehicle system that is on flat ground (e.g., vehicle system 100 at FIG. 1), active engine mount 300 may be oriented in a substantially vertical direction. However, in other configurations, active engine mount 300 may be oriented at an oblique angle relative to vertical. As used herein, however, the terms "upper" and "lower" may refer to respective ends of arrow 398, which indicates a directional axis specific to the active engine mount. That is to say, arrow 398 provides reference for a relative positioning of components constituting active engine mount 300, and not a reference for the orientation of active engine mount 300 within a vehicle system. Additionally, an upper end of the active engine mount may refer to the end closer toward the head of arrow 398 and a lower end of the active engine mount may refer the end closer toward the tail of arrow 398.

Active engine mount 300 includes an upper external housing 302 with a central opening 312 formed within a top surface thereof. Upper external housing 302 may be formed from a rigid material, such as a metal or hard plastic. Central opening 312 is configured to receive a fastener or bolt 306, which extends outwardly from a first elastomeric member or main rubber element (not shown, but see FIG. 4) for fastening to a component of the vehicle powertrain (e.g., engine 10 of FIG. 1). Bolt 306 may be formed from a rigid material such as steel or aluminum.

An upper end of bolt 306 may be configured to rotate about the clearance of central opening 312, while the lower end (not shown) may be lodged in a first elastomeric member of the active engine mount, and as such the lower end of the bolt may remain relatively stationary compared to the upper end of the bolt. In another example, bolt 306 may extend outwardly from a bearing member (not shown) that is partially encapsulated within the first elastomeric member of the housing, and may be configured to transfer vibrations to the first elastomeric member via the bearing member.

Bolt 306 may be coupled to a rigid upper bracket 339 via a fastener 340. It will be appreciated that upper bracket 339 may be similar to a member 139 described in FIG. 1. Upper bracket 339 may be formed from one of a metal or a hard plastic. A distal portion 338 of the upper bracket 339 may be coupled to a vehicle powertrain component (e.g., coupled to the powertrain component at a flange affixed thereto) via a fastener, in a manner generally known in the art.

Lower external housing 304 may be fastened (e.g., mechanically coupled) to upper housing 302. Lower external housing 304 may be formed from a rigid material such as one of a metal or hard plastic. A coupling of the lower housing to a vehicle frame (e.g., 105 at FIG. 1) may be achieved via a plurality of lower brackets. In this way, the external housing may remain structurally rigid (e.g., substantially non-compressible), and any vibrations absorbed from the vehicle powertrain or vehicle frame may be transferred to the first elastomeric member within the external housing, said first elastomeric member configured to dampen the vibrations.

Shown in FIG. 3 are first lower bracket 332 and second lower bracket 334. It will be appreciated that still further brackets may be affixed to lower external housing 304 in a similar manner to first lower bracket 332 and second lower bracket 334 without departing from the scope of the invention. The lower brackets may be formed from metal, such as steel. However, other materials may be used to form the lower brackets without departing from the scope of the present invention. First lower bracket 332 is shown integrally formed with lower external housing 304. A bolt (not shown) may couple (e.g., mechanically) first lower bracket 332 to a vehicle frame via hole 382. Second lower bracket 334 is shown affixed to, but not integrally formed with, lower external housing 304, and may similarly be coupled to the vehicle frame via hole 384.

FIG. 4 shows a cross-sectional view 400 of an active engine mount (e.g., active engine mount 133 of FIG. 1 or active engine mount 200 of FIG. 2). It may be understood that the active engine mount depicted at FIG. 4 is meant to be illustrative, and is not meant to be limiting. As used herein, the terms "upper" and "lower" may refer to respective ends of arrow 498. It will be appreciated that arrow 498 may provide a reference for the relative positioning of components within the active engine mount.

The active engine mount assembly may include an external housing 402 (e.g., similar to upper external housing 302 of FIG. 3) dimensioned to receive a first elastomeric member 404 that is generally shaped as a truncated cone, and primarily made of an elastomeric material, such as an elastic rubber as is conventional in the art. A bolt 406 (e.g., similar to bolt 306 at FIG. 3) extends outwardly from the first elastomeric member for fastening to the powertrain or engine (not shown) in a manner generally known in the art. In the depicted example, bolt 406 with a metal bearing member 408 of which at least a lower portion encapsulated within the first elastomeric member 404. In addition, a lower peripheral portion of the first elastomeric member may include a stiffener, such as metallic stiffener 410, molded within the first elastomeric member to add rigidity and support. In this way, vibrations and/or displacements from the powertrain may be transferred to the first elastomeric member 404 of the active engine mount.

As discussed above with regard to FIG. 3, the first elastomeric member is received within the upper external housing 402 so that the bolt 406 extends through a central opening 412 in the restrictor. The lower surface 405 of the first elastomeric member 404 forms a portion of a first or upper fluid chamber 416, namely a high pressure side, of the engine mount. First fluid chamber 416 may be filled with a hydraulic fluid (e.g., glycol). The remainder of the first fluid chamber 416 is defined by the inertia track assembly 420. It may be understood that inertia track assembly 420 may herein also be referred to as a partitioning structure. An outer portion of an upper surface of the partitioning structure (denoted by reference numeral 422) abuttingly and sealingly engages the first elastomeric member 404 in order to seal the first fluid chamber 416. A second outer portion of the partitioning structure along the lower surface denoted by reference numeral 424 is sealingly engaged by a second elastomeric member 430 (a rubber boot or diaphragm) and particularly an upper peripheral portion 432 thereof. Lower surface 424 of the partitioning structure 420, in combination with second elastomeric member 430, form a second or lower fluid chamber 450. Second fluid chamber may too be filled with a hydraulic fluid (e.g., glycol). The second elastomeric member 430 is protected by a diaphragm cover 434, preferably formed of a more rigid material than the elastomeric diaphragm, and that matingly engages (e.g., mechanically couples to) the lower external housing 440. When the lower external housing 440 is fastened to the upper housing, the lower peripheral edge of the first elastomeric member 404 and the peripheral portion 432 of the second elastomeric member sealingly engage opposite sides or faces 422, 424, respectively, of the partitioning structure 420.

The partitioning structure and operation of a typical engine mount 400 will be briefly described. As indicated, the first fluid chamber 416 and the second fluid chamber 450 are fluidly coupled together by partitioning structure 420. Partitioning structure 420 comprises a channel plate 401, a decoupler 460 (e.g., compliant membrane), a first fluid track 470 (e.g., idle track), a second fluid track 475 (e.g. ride track), and a vacuum chamber 465. Vacuum chamber 465 may be coupled to the partitioning structure such that the vacuum chamber may defined by passageways in the channel plate 401, and wherein a segment of the vacuum chamber is defined by decoupler 460. Vacuum chamber 465 may be fluidly connected to a source of either vacuum, or atmospheric pressure, via conduit 480. Vacuum may be provided by any available source of vehicle vacuum, for example intake manifold vacuum, to the vacuum chamber 465 via a vacuum line (not shown). A solenoid valve (e.g., a three-way solenoid valve) may control the amount of vacuum within the vacuum line. In one example, a first pressure 447 (e.g. atmospheric pressure), or a second pressure 448 (e.g. vacuum) may be applied to vacuum chamber 465, via controlling two-way valve 446. For example, controller 12, may command two-way valve 446 to enable the first pressure, or the second pressure, to be communicated to vacuum chamber 465, depending on vehicle operating conditions, as will be discussed in further detail below. More specifically, controller 12 may send a signal to two-way valve 446 to actuate the valve to either couple first pressure 447 to vacuum chamber 465, or to couple second pressure 448 to vacuum chamber 465.

When vacuum chamber 465 is at atmospheric pressure (e.g., a first pressure), decoupler 460 may be free to move. Furthermore, when vacuum chamber 465 is at atmospheric pressure, a first vacuum actuated valve 455 is seated in an upper position within channel plate 401 such that the first fluid track 470 is closed. When in such a configuration, the decoupler 460 may breathe in response to vibrations or displacements, and fluid flow between first fluid chamber 416 and second fluid chamber 450 may only be allowed via the second fluid track 475. As such, engine mount 400 typifies decoupled engine mount function when vacuum chamber 465 is at atmospheric pressure. Such a configuration of active engine mount 400 may be termed a second, or stiffening mode of active engine mount operation.

Alternatively, application of vacuum to vacuum chamber 465 may serve to seat decoupler 460 against channel plate 401, indicated by arrow 486, and furthermore may position first vacuum actuated valve in a lower position, indicated by arrow 485. As such, first fluid track 470 is opened, and decoupler 460 is not permitted to move, or breathe. Accordingly, fluid flow between first fluid chamber 416 and second fluid chamber 450 occurs via the first fluid track 470, as first fluid track 470 represents the path of least resistance through the inertia track assembly 420, thus providing a soft engine mount for idle mode operation. In other words, with vacuum chamber 465 coupled to second pressure 448 (e.g. vacuum), active engine mount 400 may be understood to be operating in a first, or dampening mode of active engine mount operation.

Further, controller 12 (similar to controller 12 described in FIGS. 1 and 2) may be configured to monitor vibrational frequencies and amplitude generated by vehicle powertrain (e.g. powertrain 110 of FIG. 1). As an example, when a relatively low frequency is produced (e.g., low amplitude torque pulses during engine idle condition), the controller may apply vacuum to vacuum chamber 465, such that the active engine mount is operating in the first, dampening mode. In another example, when a high frequency vibration is detected (e.g., during rapid acceleration and/or high engine load condition), the controller may apply a first, atmospheric pressure to vacuum chamber 465, such that the active engine mount is operating in the second, stiffening mode. In this way, the active engine mount may isolate the broad range of vibrational frequencies and amplitudes generated by the vehicle powertrain under different engine operating modes.

FIGS. 3 and 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As mentioned earlier, engine 10 (of FIGS. 1-2) may be operated in VDE mode or non-VDE (all cylinder firing) mode. Further, a portion of an engine's cylinders may be disabled during selected conditions, where the selected conditions can be defined by parameters such as an engine speed/load conditions. In addition, a controller may disable selected cylinders through the sealing of the cylinder's intake and exhaust valves. Noise, vibration and harshness (NVH) issues may arise during transitions in engine operating modes from VDE mode to non-VDE mode, and vice versa, and in order to provide fuel economy benefits along with reduced NVH, engine 10 may be primarily operated in either an even firing three-cylinder or an even firing VDE mode, for example. In another example, transitioning between VDE mode and non-VDE mode may involve alternating between a four-cylinder (V4) mode of operation and an eight-cylinder (V8) mode of operation. Thus, when shifting from a V4 to a V8 mode, previously deactivated cylinders may be activated and all cylinders may fire. In contrast, when shifting from a V8 to a V4 mode, selected cylinders may be deactivated. In one example, the first four cylinders in the firing order may be deactivated, while the next four cylinders in the firing order may fire. However, during the transition between non-VDE to VDE mode, engine vibration may be experienced due to torsional vibrations. For example, when transitioning from non-VDE to VDE mode, the engine may be providing the same output with fewer cylinders firing and thus, torque fluctuation may occur due to fewer firing events and lower firing frequency, which may lead to increased engine vibration. This increase in engine vibration may not usually be detected by the vehicle operator since active engine mounts are configured to absorb vibrations from the engine. In order to ensure that active engine mounts are functioning as desired, active engine mount health may be monitored by conducting active engine mount diagnostic routine periodically. In this way, undesirable engine NVH issues may be averted and vehicle performance may be improved.

Thus, the components of FIGS. 1-4 enables a vehicle system comprising: an engine including one or more cylinders; an electric motor device coupled to a battery; a transmission coupled to at least the engine; one or more active engine mounts configured to isolate engine vibrations from a vehicle chassis; one or more vibrational sensors configured to monitor vehicle chassis vibration; and a controller. The controller may include computer readable instructions stored on non-transitory memory for: when the engine is idling condition, inducing vehicle vibrations via spinning the engine unfueled using the motor while selectively deactivating one or more valves of engine cylinders; while inducing the vibrations, adjusting the active engine mounts to a first, dampening mode for a first predetermined duration, followed by a second, stiffening mode during a second predetermined duration, and then returning to the first, dampening mode during a third predetermined duration during the inducing; monitoring an amount of vehicle chassis vibration during the adjusting; and indicating active engine mounts degradation based on the monitored amount of chassis vibration in each operating mode. In one example, the one or more vibrational sensors configured to monitor vehicle chassis vibration may include one or more of the following: a fuel level sensor configured to monitor level of fuel slosh in a fuel tank that provides fuel to the engine; and a vibrational sensor coupled to a suspension system of the vehicle. In a further example, the vehicle system may further comprise: an antilock brake system for increasing or decreasing hydraulic pressure to one or more vehicle wheel brakes; a parking brake system for providing variable braking force on a wheel; and wherein the controller further stores instructions comprising: commanding the transmission to a drive mode operation; commanding or maintaining application of the wheel brakes; and commanding the parking brake system to provide full braking force. In one example, the controller may further stores instructions in non-transitory memory, that when executed, cause the controller to: indicate that the one or more active engine mounts are stuck in the first, dampening mode, responsive to vehicle vibrations as monitored via the one or more vibrational sensors when the vibration during each of the first, second, and third predetermined durations is less than a threshold; and indicate that the active engine mounts are stuck in the second, stiffening mode, responsive to vibrations as monitored via the one or more vibrational sensors when the vibration during each of the first, second, and third predetermined durations is higher than a threshold.

Figure 5:
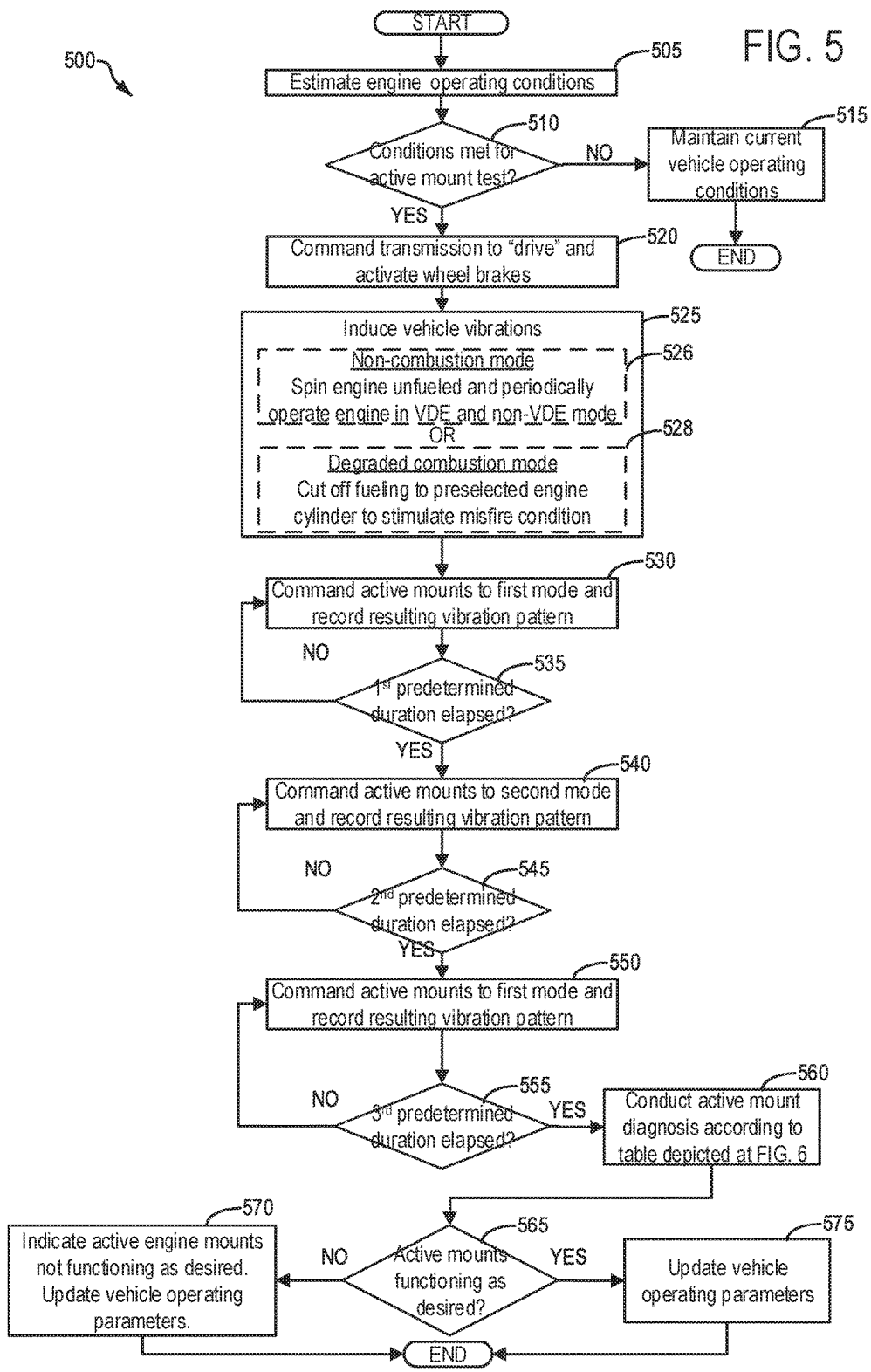
FIG. 5 is a high-level flowchart demonstrating an example routine for diagnosing an active engine mount.

Turning to FIG. 5, a high-level example routine 500 for conducting an engine mount diagnostic, is shown. Instructions for carrying out method 500 and the rest of the methods included herein may be executed by the controller based on instructions stored on a memory of the controller and in conjunction with signals received from sensors of the engine system, such as the sensors described above with reference to FIG. 1 and FIG. 4. The controller may employ engine actuators of the engine system to adjust engine operation, according to the methods described below.

At 505, engine operating conditions may be estimated, measured, and/or inferred. These may include, for example, vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

At 510, it may be determined whether conditions are met for conducting an active engine mount test. For example, conditions being met may include an engine on condition. Conditions being met for the active engine mount diagnostic may further include an indication that the vehicle is in an idle mode, where the engine is running, but where the vehicle is not in motion (i.e. in static condition). Still further, conditions being met for the active engine mount diagnostic may include a predetermined period of time elapsing since a prior active engine mount diagnostic was conducted. In some examples, the predetermined period of time may include 30 days, or less than 30 days. In other examples, the predetermined period of time may include greater than 30 days, but less than 60 days. In further examples the predetermined period of time may include greater than 60 days. Such examples are meant to be illustrative, and are not meant to be limiting.

Further, conditions being met for the active engine mount diagnostic may additionally or alternatively include an indication of a remote start event. For example, a vehicle operator may initiate a remote start event via a key fob (e.g. key fob 194 of FIG. 1), which may send a wireless signal (e.g. wireless signal 195 of FIG. 1) to a remote engine start receiver (e.g. remote engine start receiver 192 of FIG. 1), to initiate engine activation, such that the engine begins combustion of air and fuel.

In some examples, conditions being met for the active engine mount diagnostic may additionally or alternatively include an indication that the vehicle is not occupied. For example, the vehicle controller (e.g. controller 12 of FIG. 1) may interpret signals received from seat load cells (e.g. seat load cells 189 of FIG. 1), door sensing technology (e.g. door sensing technology 190 of FIG. 1), and/or onboard camera(s) (e.g. onboard camera 191 of FIG. 1), to determine whether the vehicle is occupied. In some examples, method 500 may include prohibiting, or aborting an active engine mount diagnostic if the vehicle is indicated to be occupied. Furthermore, if it is indicated that the vehicle has become occupied while the diagnostic is in progress, diagnostic routine may be aborted or suspended and may be resumed when the vehicle becomes unoccupied. Still further, it may be understood that, in some examples, the active engine mount diagnostic may be conducted even if it is indicated that the vehicle is occupied.

If conditions are not indicated to be met for the active mount test, then method 500 may proceed to 515 where the current vehicle operating conditions are maintained and no active engine mount diagnostic routine is conducted. Method 500 may then end.

If conditions are indicated to be met for conducting the active engine mount diagnostic, method 500 may then proceed to 520 where the vehicle is commanded to "drive" with wheel brakes activated. More specifically, method 500 may include commanding the transmission to the drive mode of operation, or if already in drive mode, maintaining the transmission in drive mode. Furthermore, at step 520, method 500 may include activating wheel brakes via, for example, antilock braking system (e.g. antilock braking system 113 of FIG. 1) configured to increase hydraulic pressure to one or more vehicle wheels to increase braking force on the one or more wheels. In one example, a controller may be configured to command the brake pedal to be depressed. With the vehicle transmission configured in drive mode, and with the brake pedal depressed, or with brakes activated, the vehicle frame (e.g. vehicle frame 105 of FIG. 1) may be stiffened, and mechanically coupled to the engine (e.g. engine 10 of FIG. 1). In some examples, method 500 may further include the vehicle controller communicating with (e.g. sending a signal to), an electronic parking brake system to engage an electronic parking brake (e.g. electronic parking brake 152 of FIG. 1). Engaging the electronic parking brake may serve to further mechanically couple the vehicle frame to the engine.

At 525, vehicle vibration is induced either in a non-combustion mode (step 526) or in degraded combustion mode (step 528). The non-combustion mode includes, at 526, spinning the engine unfueled and periodically operating the engine in VDE and non-VDE mode, while the degraded combustion mode includes, at 528, cutting off fuel to preselected engine cylinder to stimulate misfire condition. The decision to induce vehicle vibration via non-combustion mode or degraded combustion mode may be pre-determined by the vehicle controller, for example, it may be set by the vehicle manufacturer. In another example, method 500 may include inducing vehicle vibration via non-combustion mode followed by degradation combustion mode, or vice versa.

In another example, the controller may be further configured to determine if the vehicle is operating on electric-only mode (e.g., plug-in hybrid electric vehicle) or in gasoline mode. If the vehicle is operating in electric-only mode, then the vehicle vibration may be induced by non-combustion mode (i.e. via spinning the engine unfueled and periodically operating the engine in VDE and non-VDE mode).

Alternatively, if the vehicle is operating in gasoline mode, the method may preview the trip route and if there is ample opportunity for the vehicle to run in downhill deceleration fuel shut off (DFSO) mode, then the vehicle vibration may be induced via non-combustion mode. Otherwise, the vehicle vibration may be induced via degraded combustion mode. The non-combustion mode is more favorable to use for inducing vehicle vibration since it may minimize disturbances to the air-fuel ratio and it provides a less intrusive vehicle vibration inducing strategy to the on-board control systems. Further, the vibration patterns from these two modes may then be combined and analyzed by the vehicle controller.

In one example, inducing vehicle via non-combustion mode via spinning the engine unfueled and periodically operating the engine in VDE and non-VDE mode may include utilizing vehicle battery power to operate motor/generator as the only source of torque, while fueling to all the cylinders is disabled. Further, torque from the electric motor/generator of the vehicle may be used to spin the engine at an increasing and decreasing speed. For example, the engine may be spun at first, higher speed for a first duration and a second, lower speed for a second duration, while at the same time commanding the engine to operate under VDE mode and non-VDE mode periodically in a cyclic fashion. In another example, the engine speed may be varied by operating the motor/generator to higher/lower current value. Further, operating engine under VDE mode and non-VDE mode may include selectively sealing and unsealing the intake and exhaust valves of one or more engine cylinders. The transition between VDE mode and non-VDE mode may affect the manifold pressure, engine airflow, engine torque output, and engine power, which in turn, may produce engine vibrations.

In another example, inducing engine vibration via degraded combustion mode via cutting off fuel to preselected engine cylinder to stimulate misfire condition may include sending a command to a fuel injector (e.g. fuel injector 66 of FIG. 1) and actuating the fuel injector to stop injection of fuel to the preselected engine cylinder. In one example, the preselected engine cylinder may include a cylinder that, when fuel injection is terminated to that cylinder, results in the greatest amount of vibration being transmitted to the vehicle frame. In other words, degraded combustion may be induced in the preselected cylinder such that engine mechanical vibration, the result of degraded combustion while fuel injection to the preselected cylinder is stopped, is transmitted to the vehicle frame in a predictable fashion. More specifically, vibrations from the engine and transferred to the vehicle frame may correspond to the degraded combustion events, such that degraded combustion events may be correlated with increased vibration. In one example, an electronically-controlled throttle (e.g. throttle 197 of FIG. 1) may be adjusted to a wider angle, or more open position, such that more intake air may be routed to the engine for combustion. In yet further example, combustion initiation may be advanced in the remaining activated cylinders such that engine knock may occur which further increases engine vibration. In another example, a controller may be configured to regulate engine speed (RPM) during the inducing to increase and decrease the engine speed in a cyclic fashion for the duration of the active engine mount diagnostic. By changing the engine speed up and down in periodic fashion throughout the duration of the active engine mount test diagnostic, vehicle vibration may be increased. In a still further example, compressor (e.g. A/C compressor 198 of FIG. 1) and A/C system (e.g. A/C system 199 of FIG. 1) may be periodically enabled and disabled. For example, the A/C and compressor may be enabled for a first predetermined duration, then disabled for a second predetermined duration for the duration of the active engine mount diagnostic routine, for example. By cycling the A/C compressor between on and off conditions, vehicle vibration may be increased.

Once the vehicle vibration is induced, the method proceeds to 530 where active engine mounts are commanded to operate in a first mode (e.g. dampening mode), and resulting pattern of vehicle frame vibration is recorded. In one example, vibration may be monitored via a fuel level sensor, or fuel level indicator, positioned within the fuel tank. More specifically, vehicle vibration may be monitored as a function of fuel slosh in a fuel tank, where fuel slosh may be determined via the fuel level sensor, or fuel level indicator. In another example, vehicle vibration may be monitored as a vibrational amplitude within a specified frequency range as monitored via active suspension sensors coupled to the vehicle suspension system.

Operating active engine mounts in a first, dampening mode is expected to dampen vehicle vibration, such that little or no vibrational amplitude above a threshold may be recorded. The vibrational threshold may be a pre-determined number set by the vehicle manufacturer, for example. In another example, the vehicle controller may keep learning and updating the vibrational threshold when the active engine mount is functioning as expected.

At 535, it may be determined whether a first predetermined time duration has elapsed. If the first predetermined time duration has not elapsed, then method 500 may return to 530 where the active engine mounts may continue to operate in the first mode and continue to record the resulting vibration pattern in the first operating mode until the first predetermined duration has elapsed. If the first predetermined duration has elapsed, the method may proceed to 540.

At 540, the active engine mounts are commanded to operate in a second mode of operation (i.e. stiffening mode), and the resulting pattern of vehicle frame vibration is recorded. In the stiffening mode, vehicle vibrations may be expected to be significant, or not substantially dampened, such that vehicle vibrations as recorded via the fuel level indicator and/or active suspension sensor, may have higher than threshold vibrational amplitude.

Commanding the active engine mounts to the second mode at 540 may include commanding the active engine mounts to the second mode for a second predetermined time duration. In some examples, the second predetermined time duration may be different than that of the first predetermined time duration. In another example, the second predetermined duration may be identical with the first predetermined time duration.

At 545, it may be determined whether the second predetermined time duration has elapsed. If the second predetermined time duration has not elapsed, method 500 may return to 540, where the active engine mounts are maintained in the second mode, and the resulting pattern of vehicle frame vibration may continue to be recorded until a second predetermined duration has elapsed. If the second predetermined duration has elapsed, the method proceeds to 550.

At 550, method 500 may include commanding the active engine mounts to operate in the first dampening mode. Accordingly, the resulting pattern of vehicle frame vibration may again be recorded via the vehicle controller while the active engine mounts are configured in the first mode. The return to the first mode of operation may be carried out for a third predetermined time duration. In some examples, the third predetermined time duration may be the same, or substantially the same, as the first predetermined time duration and/or the second predetermined time duration. In another example, the third predetermined time duration may not be the same time duration as that of the first predetermined time duration, or the second predetermined time duration.

At 555, method 500 may include indicating whether the third predetermined time duration has elapsed. If, at 555, the third predetermined time duration has not elapsed, method 500 may return to 550, and may include continuing to maintain the active engine mounts in the first mode, and may further include continuing to record the resulting pattern of vehicle frame vibration. Otherwise, the method may proceed to 560 where the conditions of active engine mount may be determined according to the table depicted in FIG. 6, which will be further elaborated below.

As an example, based on the recorded vibration patterns during the first, second and third duration, a controller may be configured to detect if the vibration patterns exceed a threshold in the selected active engine mount operating mode. For example, a vibrational threshold for each selected operating mode may have been pre-set by the vehicle manufacturer and updated into the vehicle memory, and during active engine mount diagnosis routine, the controller may compare the values between the recorded vibrations to the vibrational threshold values. If the vibration patterns falls within the threshold values, then it may be inferred that the active engine mounts are functioning as desired. However, if the vibration are not within the threshold values, then it may be inferred that the active engine mounts are not functioning as desired. In one example, the table depicted in FIG. 6 may comprise of three potential outcomes of the active engine mount diagnosis, which may include indicating the active engine mounts are functioning as desired or not as desired. As an example, indicating the active engine mounts are not functioning as desired may further include indicating that the active engine mounts being stuck in either, the first, dampening mode or the second, stiffening mode.

At 565, based on the diagnosis outcome from FIG. 6, it may be determined if the active engine mounts are functioning as desired. Responsive to an indication that the active engine mounts are functioning as desired, method 500 may proceed to 575, and may include updating vehicle operating parameters. Updating vehicle operating parameters at 575 may include storing the results of the test diagnostic at the controller.

Alternatively, at 565, if the active engine mounts are not functioning as desired, method 500 may proceed to 570 where it is indicated that the active engine mounts are not functioning as desired. For example, at 570, method 500 may include indicating that either the active engine mounts are stuck in the first, dampening mode, or that the active engine mounts are stuck in the second, stiffening mode. The method may further include updating vehicle operating parameters. For example, updating vehicle operating parameters at 570 may include storing the results of the test diagnostic at the controller. More specifically, it may be indicated that an active engine mount are stuck in one of the first mode, or the second mode, depending on the outcome of the test diagnostic (from FIG. 6). Updating vehicle operating parameters may further include setting a flag at the controller, or setting a diagnostic trouble code (DTC). Still further, updating vehicle operating parameters may include illuminating a malfunction indicator light (MIL), alerting a vehicle operator (if present) of the need to service the vehicle. In one example, updating vehicle operating parameters may include limiting a maximum engine speed responsive to an indication that the active engine mounts are stuck in the second, stiffening mode.

Turning now to FIG. 6, table 600 illustrates potential outcomes of the active engine mount test diagnostic routine. In one example, the table of FIG. 6 may be performed as part of the routine of FIG. 5, such as at 560. In some examples, table 600 may comprise a lookup table, and may be stored at the vehicle controller. Table 600 may be indexed based on the potential outcome (A-C) with its corresponding diagnosis outcome, where outcome A corresponds to active engine mounts functioning as desired, potential outcome B corresponds to active mounts being stuck in the first mode (e.g. dampening mode), and outcome C corresponds to active mounts being stuck in the second mode (e.g. stiffening mode). The recorded pattern of vehicle vibration during the first predetermined duration 630 where the active engine mounts are configured in the first mode, during the second predetermined duration 640 where the active engine mounts are configured in the second mode, and during the third predetermined duration 650 where the active engine mounts are configured in the first mode, may be compared to outcome A-C in order to diagnose the conditions of the active engine mounts. In one example, a magnitude of vehicle frame vibrations may be indicated via the fuel level indicator and/or active suspension sensor, and the magnitude of the vibrations may be compared to the threshold vibration level at the end of each predetermined duration. If the magnitude of vehicle frame vibrations exceed a threshold, then a "Yes" answer is recorded and if the magnitude of vehicle frame vibrations does not exceed a threshold, then a "No" answer is recorded.

In one example, if the vibrational amplitude recorded by the controller during the first predetermined duration when the active engine mounts are operating in a first, dampening mode is less than a threshold ("No" in column 630), and above a threshold during the second predetermined duration ("Yes" in column 640) when the active engine mounts are operating in a second, stiffening mode, and below a threshold during the third predetermined duration ("No" in column 650) when the active engine mounts are operating in the first, dampening mode, then controller may output "A" as the diagnosis outcome, which correlates to the active engine mounts functioning as desired.

In another example, if the vibrational amplitude recorded by the controller during the first predetermined duration when the active engine mounts are operating in a first, dampening mode is less than a threshold ("No" in column 630), and above a threshold during the second predetermined duration ("No" in column 640) when the active engine mounts are operating in a second, stiffening mode, and below a threshold during the third predetermined duration ("No" in column 650) when the active engine mounts are operating in the first, dampening mode, then controller may output "B" as the diagnosis outcome, which correlates to active engine mounts being stuck in the first, dampening mode.

In yet another example, if the vibrational amplitude recorded by the controller during the first predetermined duration when the active engine mounts are operating in a first, dampening mode is less than a threshold ("Yes" in column 630), and above a threshold during the second predetermined duration ("Yes" in column 640) when the active engine mounts are operating in a second, stiffening mode, and below a threshold during the third predetermined duration ("Yes" in column 650) when the active engine mounts are operating in the first, dampening mode, then controller may output "C" as the diagnosis outcome, which correlates to active engine mounts being stuck in the second, stiffening mode.

Referring now to FIG. 7, an example active engine mount diagnostic is shown. The example includes inducing vehicle vibration via a non-combustion mode (between t1 to t5) and via a degraded combustion mode (between t6 to t9). Map 700 depicts active engine mount operating mode at plot 703, degraded combustion mode indication at 705, engine speed (RPM) at plot 707, VDE mode indication at 709, and engine vibration at plot 711. Map 700 further depicts an indication on whether the active engine mounts are functioning as desired at plot 740. All plots are depicted over time along the x-axis. Time markers t1-t9 depict time points of significance during fuel system calibration.

Prior to the active engine mount diagnostic routine, between t0 and t1, the vehicle may be moving (plot 807) and thus it may be determined that the conditions are not being met for conducting active engine mount diagnostic routine. As conditions are not met for the active engine mount diagnostic to be conducted, fueling to the engine cylinder is maintained (not shown). Accordingly, no degraded combustion mode (plot 705) or VDE mode (plot 709) is indicated.

At t1, the vehicle comes to a stop with the engine maintained running. Since the vehicle is in static condition, it may be determined that the conditions are met for conducting the active engine mount diagnostic routine. Further, responsive to the indication for conducting active engine mount diagnostic routine, the controller may be configured to command the wheel brakes to be activated, and the brake pedal may be maintained depressed, such that the braking force of the vehicle may be increased. Still further, the vehicle transmission may be maintained in drive, or commanded via the controller to drive. Still further, an electric parking brake may be commanded to be engaged. In addition, the controller may decide to induce vehicle vibration via a first, non-combustion mode. As a consequent, fuel injection to all cylinders may be inhibited and the controller may command the engine to spin unfueled. Further, engine RPM is commenced cycling between an increased RPM, and a decreased RPM. For example, engine RPM may be increased to a first predetermined RPM, and then decreased to a second predetermined RPM, and such a cycle may be continued throughout the duration of the active engine mount diagnostic routine, indicated by plot 707. Furthermore, the controller may activate VDE mode in a periodic fashion throughout the duration of active engine mount diagnostic routine via non-combustion mode, as indicated by plot 709.

Between t2 and t3, with the active engine mounts configured in the first, damping mode (plot 703), vehicle frame vibrations, for example a pattern of vehicle frame vibrations, are recorded. As indicated, three VDE on/off modes are indicated between time t2 and t3, however, such an example is illustrative, and more than three VDE on/off modes may occur between time t2 and t3. The time period between time t2 and t3 may be understood to comprise the first predetermined duration, as discussed above in FIGS. 5-6. The vehicle/engine vibration patterns as indicated at plot 711 during this time is indicated to be above threshold 710, thus a "Yes" answer is updated into the controller memory during the first predetermined duration (e.g., column 630 of FIG. 6).

At t3, the active engine mounts are switched from the first mode, to the second, stiffening mode. Between time t3 and t4, with the active engine mounts configured in the second mode, the pattern of vehicle frame vibrations are recorded by the vehicle controller. The time period between time t3 and t4 may be understood to comprise the second predetermined time period, as discussed above. The vehicle/engine vibration patterns as indicated at plot 711 during this time is indicated to be above threshold 710, thus a "Yes" answer is updated into the controller memory during the second predetermined duration (e.g., column 640 of FIG. 6).

At time t4, the active engine mounts are switched from the second mode, back to the first mode. Between time t4 and t5, with the active engine mounts configured in the second mode, the pattern of vehicle frame vibrations are recorded by the vehicle controller. Similar to that described above, three VDE on/off modes are indicated between time t4 and t5. The time period between time t4 and t5 may be understood to comprise the third predetermined time period, as discussed above. The vehicle/engine vibration patterns as indicated at plot 711 during this time is indicated to be above threshold 710, thus a "Yes" answer is updated into the controller memory during the third predetermined duration (e.g., column 650 of FIG. 6).

At t5, the active engine mount diagnostic with vehicle vibration induced via non-combustion mode is complete. The controller may, at this point, query a lookup table in order to determine whether the active engine mounts are functioning as desired. In one example, the lookup table may comprise lookup table 600 depicted in FIG. 6. The controller may retrieve the 'answers' stored in the memory during the first, second and third predetermined periods. In the depicted example, the outcome C may be provided by the controller since "Yes" is indicated for all predetermined periods. As a result, the controller may determine that the active engine mount is not functioning as desired and specifically, the active engine mounts are stuck in the second, stiffening mode. In response to active engine mount being stuck in the stiffening mode, an error flag may be set. In one example, the error flag counter may be updated at the same time, and once the number of error flags exceeds a threshold, an indication may be provided to the vehicle operator to service or repair the active engine mounts. In one example, a diagnostic trouble code (DTC) may be indicated. Alternatively, a malfunction indicator light (MIL) may be illuminated.

Alternatively, the controller may combine the vibrational pattern data from inducing vehicle vibration via non-combustion mode and degraded combustion mode. Thus, at t6, the VDE mode indication is disabled (plot 709), and the degraded combustion mode is enabled (plot 705). Further, fueling is cut off to the preselected engine cylinder. More specifically, a command may be sent from the controller to a fuel injector configured to deliver fuel to the preselected cylinder, commanding the fuel injector be stopped from delivering fuel to the preselected cylinder. Similar to inducing vibration via non-combustion mode, engine RPM is commenced cycling between an increased RPM, and a decreased RPM during the degraded combustion mode, as shown at plot 707. Further, spark to the engine cylinders not comprising the preselected cylinder may be advanced, to increase vehicle vibration. Additionally, engine throttle may be commanded to a more opened position such that a greater intake air flow may be provided to the engine which may further increase vehicle vibration. Furthermore, the A/C compressor may be cycled on and off for the duration of the active engine mount test diagnostic to create more RPM turbulences.

Thus, between time t6 and t7, with the active engine mounts configured in the first, damping mode (plot 703), vehicle frame vibrations, for example a pattern of vehicle frame vibrations, are recorded. As indicated, three degraded combustion events are indicated between time t6 and t7. The time period between time t6 and t7 may be understood to comprise the first predetermined time period. The vehicle/engine vibration patterns as indicated at plot 711 during this time is indicated to be above threshold 710, thus a "Yes" answer is updated into the controller memory during the first predetermined duration (e.g., column 630 of FIG. 6).

At t7, the active engine mounts are switched from the first mode, to the second, stiffening mode (plot 703). Between time t7 and t8, with the active engine mounts configured in the second mode, the pattern of vehicle frame vibrations are recorded by the vehicle controller. The time period between time t7 and t8 may be understood to comprise the second predetermined time period, as discussed above. The vehicle/engine vibration patterns as indicated at plot 711 during this time is indicated to be above threshold 710, thus a "Yes" answer is updated into the controller memory during the second predetermined duration (e.g., column 640 of FIG. 6).

At time t8, the active engine mounts are switched from the second mode, back to the first mode (plot 730). Between time t8 and t9, with the active engine mounts configured in the second mode, the pattern of vehicle frame vibrations are recorded by the vehicle controller. Similar to that described above, three degraded combustion modes/events are indicated between time t8 and t9. The time period between time t8 and t9 may be understood to comprise the third predetermined time period, as discussed above. The vehicle/engine vibration patterns as indicated at plot 711 during this time is indicated to be above threshold 710, thus a "Yes" answer is updated into the controller memory during the third predetermined duration (e.g., column 650 of FIG. 6).

At t9, the active engine mount diagnostic with vehicle vibration induced via degraded combustion mode is complete. The controller may, at this point, query a lookup table in order to determine whether the active engine mounts are functioning as desired. In one example, the lookup table may comprise lookup table 600 depicted in FIG. 6. The controller may retrieve the 'answers' stored in the memory during the first, second and third predetermined durations during the degraded combustion modes. In another example, the controller may also retrieve the 'answers' stored previously during active engine mount diagnostic via non-combustion mode (i.e. vibration pattern recorded during time t1-t5). In the depicted example, the active engine mount diagnostic routine is performed via both, non-combustion and degraded combustion modes. In addition, outcome C is provided, since "Yes" is indicated for all predetermined durations (t1-t5 for non-combustion mode and t6-t9 for degraded combustion mode). As a result, the controller may determine that the active engine mount is not functioning as desired and specifically, the active engine mounts are stuck in the second, stiffening mode. In response to active engine mount being stuck in the stiffening mode, an error flag may be set. In one example, the error flag counter may be updated at the same time, and once the number of error flags exceeds a threshold, an indication may be provided to the vehicle operator to service or repair the active engine mounts. In one example, a diagnostic trouble code (DTC) may be indicated. Alternatively, a malfunction indicator light (MIL) may be illuminated.

Alternatively, the controller may compare the results gathered from running active engine mount diagnostic via non-combustion mode and degraded combustion mode, and if the 'answers' provided are not similar between the two modes, a third diagnostic routine may be performed to ensure the accuracy of the diagnostic outcome.

In this way, an active engine mount diagnostic may be conducted with improved accuracy. In some examples, the test may be conducted on an autonomously driven vehicle such that a diagnosis may be made as to whether the active engine mounts are functioning as desired, even under circumstances where a vehicle operator or other passengers may not be present. However, such an example is not meant to be limiting, and the active engine mount test diagnostic may additionally or alternatively be conducted on vehicles not configured for autonomous driving, such as regular gasoline (or other fuel blend) vehicles, hybrid electric vehicles, plug-in hybrid electric vehicles, etc.

The technical effect is to recognize that for vehicles with actively controllable engine mounts, under static conditions such as engine idle conditions, engine vibrations may readily be induced by either spinning engine unfueled and periodically activating VDE mode, or shutting-off fueling to a preselected engine cylinder. With the engine vibrations induced, vehicle chassis vibrations may be monitored under conditions where the induced vibrations are expected to be dampened, and under conditions where the induced vibrations are not expected to be dampened. By monitoring for whether the induced vibrations are dampened, or not, while controlling the active engine mounts to both dampening modes and stiffening modes, it may be determined as to whether the active engine mounts are functioning as desired, are stuck in the dampening mode, or are stuck in the stiffening mode. By periodically determining whether the active engine mounts are functioning as desired, any NVH issues may be detected promptly and addressed in a timely manner.

One example method for a vehicle comprises: spinning an engine, which drives the vehicle, unfueled using torque from an electric motor while selectively deactivating engine valves and/or shutting-off fueling to an engine cylinder while adjusting an active engine mount responsive to a request to monitor the active engine mount; and indicating degradation of the active engine mount based on an amount of vehicle chassis vibration during the spinning. In the preceding example, additionally or optionally, the amount is an amplitude within a specified frequency range. In any or all of the preceding examples, additionally or optionally, spinning an engine unfueled using motor torque while selectively deactivating valves of engine cylinders further comprises: commanding a fuel injector configured to provide fuel to stop injection of fuel to the engine cylinders; spinning the engine with an increasing speed and a decreasing speed in a cyclical fashion; periodically sealing and unsealing all of the intake and exhaust valves associated with the deactivated cylinder(s). In any or all of the preceding examples, additionally or optionally, selectively shutting off fuel injection to a cylinder further comprises: commanding a fuel injector configured to provide fuel to the preselected engine cylinder to stop injection of fuel to the preselected engine cylinder; and increasing vehicle chassis vibration by one or more of advancing spark in one or more remaining cylinders, the remaining cylinders comprising cylinders that do not comprise the preselected cylinder, via one or more spark plug(s) configured to provide spark to the one or more remaining cylinders; increasing and decreasing a speed of the engine in a cyclical fashion; turning on a compressor for a vehicle air conditioning system for a duration, and turning off the compressor for another duration, in a cyclical fashion; and commanding an air intake throttle configured to enable air to be inducted into the engine, to a predetermined angle. In any or all of the preceding examples, additionally or optionally, adjusting an active engine mount further comprises: adjusting the active engine mount to a first, dampening mode for a first predetermined duration, followed by adjusting the active engine mount to a second, stiffening mode for a second predetermined duration, and then returning to adjusting the active engine mount to the first, dampening mode for a third predetermined duration; and wherein the adjusting the active engine mount includes adjusting the active engine mount to the first dampening mode at idle conditions to absorb undesired chassis vibration, and adjusting the active engine mount to the second, stiffening mode at higher engine speeds and loads to reduce undesired engine motion. In any or all of the preceding examples, additionally or optionally, indicating degradation of the active engine mount further comprises: determining whether vibrations stemming from the vehicle chassis as monitored via one or more vibrational sensors correlate with an increased in vibrations during the adjusting of active engine mount to the first mode and the second mode; indicating the active engine mounts are functioning as desired responsive to monitored vibrations not correlating with increased vibrations in the first mode, but where monitored vibrations are correlated with the increased vibrations in the second mode; indicating the active engine mounts are stuck in the first mode responsive to monitored vibrations not correlating with the increased vibrations in the first mode, and where monitored vibrations are not correlated with the increased vibrations in the second mode; indicating the active engine mounts are stuck in the second mode responsive to monitored vibrations correlating with the increased vibrations in the first mode, and where monitored vibrations are also correlated with the increased vibrations in the second mode. In any or all of the preceding examples, additionally or optionally, determining whether vibrations stemming from the vehicle chassis as monitored via one or more vibrational sensors correlate with the increase vibrations further comprises: indicating that the vibrations monitored via one or more vibrational sensors correlate with the increased vibrations responsive to the monitored vibrations being above a threshold vibrational level within a time threshold of the increased vibrations. In any or all of the preceding examples, additionally or optionally, the amount of the vehicle chassis vibration is measured based on a fuel slosh in a fuel tank that provides fuel to the engine, where the level of fuel slosh is indicated via a fuel level sensor. In any or all of the preceding examples, additionally or optionally, the amount of the vehicle chassis vibration is measured based on signals received by one or more vibrational sensors coupled to the vehicle suspension system. In any or all of the preceding examples, the method additionally or optionally further comprises: commanding or maintaining application of one or more wheel brakes for one or more wheels of the vehicle, commanding or maintaining engaged an electronic parking brake for one or more wheels of the vehicle, and maintaining a vehicle transmission configurable to at least a park mode, a drive mode, and a reverse mode, in a drive mode of operation. In any or all of the preceding examples, additionally or optionally, the adjusting includes adjusting while the engine is idling. In any or all of the preceding examples, additionally or optionally, the vehicle is a hybrid vehicle.

Another example method comprises: propelling an autonomous vehicle at least in part via an engine; isolating engine vibration from a vehicle chassis via one or more active engine mounts controllable to at least a dampening mode and a stiffening mode; and commencing an active engine mount diagnostic test based on predetermined conditions including one or more of an engine idle condition, a duration of time elapsing since a prior active engine mount diagnostic, a fuel level in the fuel tank between ten percent and ninety percent of a capacity of the fuel tank, an indication of a remote engine start event; and/or an indication that the vehicle is not occupied; during the engine mount diagnostic test, actively inducing vehicle vibrations via spinning an engine unfueled using torque from a motor while selectively deactivating valves of engine cylinders, or via shutting off fueling to a preselected engine cylinder to induce degraded combustion in the preselected engine cylinder; during the engine mount diagnostic test, adjusting one or more active engine mounts to the dampening mode, followed by the stiffening mode, and then returning to the dampening mode while actively inducing vehicle vibrations; and indicating whether the active engine mounts are functioning as desired, are stuck in the dampening mode, or are stuck in the stiffening mode, based on a plurality of fuel slosh events in a fuel tank resulting from both the engine spinning while selectively deactivating valves and the degraded combustion. In the preceding example, the method additionally or optionally further comprises: monitoring vehicle chassis vibration via one or more vibrational sensors while the engine mounts are adjusted to the dampening and stiffening modes, and where the monitored vibrations include vibrations due to the induced engine vibration via deactivating and reactivating one or more valves of the engine cylinders. In any or all of the preceding examples, additionally or optionally, indicating the active engine mounts are functioning as desired include monitoring vibration being dampened below a vibration threshold during each of the dampening modes and monitoring vibration being above the vibration threshold during each of the stiffening modes.

Another example vehicle system comprises: an engine including one or more cylinders; an electric motor device coupled to a battery; a transmission coupled to at least the engine; one or more active engine mounts configured to isolate engine vibrations from a vehicle chassis; one or more vibrational sensors configured to monitor vehicle chassis vibration; and a controller with computer readable instructions stored on non-transitory memory for: when the engine is idling condition, inducing vehicle vibrations via spinning the engine unfueled using the motor while selectively deactivating one or more valves of engine cylinders while inducing the vibrations, adjusting the active engine mounts to a first, dampening mode for a first predetermined duration, followed by a second, stiffening mode during a second predetermined duration, and then returning to the first, dampening mode during a third predetermined duration during the inducing; monitoring an amount of vehicle chassis vibration during the adjusting; and indicating active engine mounts degradation based on the monitored amount of chassis vibration in each operating mode. In the preceding example, additionally or optionally, the one or more vibrational sensors configured to monitor vehicle chassis vibration further includes one or more of the following: a fuel level sensor configured to monitor level of fuel slosh in a fuel tank that provides fuel to the engine; and a vibrational sensor coupled to a suspension system of the vehicle. In any or all of the preceding example, the vehicle system additionally or optionally further comprises: an antilock brake system for increasing or decreasing hydraulic pressure to one or more vehicle wheel brakes; a parking brake system for providing variable braking force on a wheel; and wherein the controller further stores instructions comprising: commanding the transmission to a drive mode operation; commanding or maintaining application of the wheel brakes; and commanding the parking brake system to provide full braking force. In any or all of the preceding examples, additionally or optionally, the controller further stores instructions in non-transitory memory, that when executed, cause the controller to: indicate that the one or more active engine mounts are stuck in the first, dampening mode, responsive to vehicle vibrations as monitored via the one or more vibrational sensors when the vibration during each of the first, second, and third predetermined durations is less than a threshold; and indicate that the active engine mounts are stuck in the second, stiffening mode, responsive to vibrations as monitored via the one or more vibrational sensors when the vibration during each of the first, second, and third predetermined durations is higher than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first"

element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle comprising:
spinning an engine, which drives the vehicle, unfueled using torque from an electric motor while selectively deactivating engine valves and/or shutting-off fueling to an engine cylinder while adjusting an active engine mount responsive to a request to monitor the active engine mount; and
indicating degradation of the active engine mount based on an amount of vehicle chassis vibration during the spinning.

2. The method of claim 1, wherein the amount of vehicle chassis vibration is an amplitude within a specified frequency range.

3. The method of claim 1, wherein spinning the engine unfueled using motor torque while selectively deactivating engine valves of engine cylinders further comprises:
commanding a fuel injector configured to provide fuel to stop injection of fuel to the engine cylinders;
spinning the engine with an increasing speed and a decreasing speed in a cyclical fashion;
periodically sealing and unsealing intake and exhaust valves associated with deactivated cylinder(s).

4. The method of claim 1, wherein selectively shutting-off fueling to the engine cylinder further comprises:
commanding a fuel injector configured to provide fuel to a preselected engine cylinder to stop injection of fuel to the preselected engine cylinder; and
increasing vehicle chassis vibration by one or more of advancing spark in one or more remaining cylinders, the remaining cylinders comprising cylinders that do not comprise the preselected cylinder, via one or more spark plug(s) configured to provide spark to the one or more remaining cylinders;
increasing and decreasing a speed of the engine in a cyclical fashion;
turning on a compressor for a vehicle air conditioning system for a duration, and turning off the compressor for another duration, in a cyclical fashion; and
commanding an air intake throttle configured to enable air to be inducted into the engine, to a predetermined angle.

5. The method of claim 1, wherein adjusting the active engine mount further comprises:
adjusting the active engine mount to a first, dampening mode for a first predetermined duration, followed by adjusting the active engine mount to a second, stiffening mode for a second predetermined duration, and then returning to adjusting the active engine mount to the first, dampening mode for a third predetermined duration; and
wherein the adjusting the active engine mount includes adjusting the active engine mount to the first, dampening mode at idle conditions to absorb undesired chassis vibration, and adjusting the active engine mount to the second, stiffening mode at higher engine speeds and loads to reduce undesired engine motion.

6. The method of claim 1, wherein indicating degradation of the active engine mount further comprises:
determining whether vibrations stemming from the vehicle chassis as monitored via one or more vibrational sensors correlate with an increase in vibrations during the adjusting of the active engine mount to a first mode and a second mode;
indicating the active engine mount is functioning as desired responsive to monitored vibrations not correlating with increased vibrations in the first mode, but where monitored vibrations are correlated with increased vibrations in the second mode;
indicating the active engine mount is stuck in the first mode responsive to monitored vibrations not correlating with the increased vibrations in the first mode, and where monitored vibrations are not correlated with the increased vibrations in the second mode;
indicating the active engine mount is stuck in the second mode responsive to monitored vibrations correlating with the increased vibrations in the first mode, and where monitored vibrations are also correlated with the increased vibrations in the second mode.

7. The method of claim 6, wherein determining whether vibrations stemming from the vehicle chassis as monitored via the one or more vibrational sensors correlate with the increase vibrations further comprises:
indicating that the vibrations monitored via the one or more vibrational sensors correlate with the increased vibrations responsive to the monitored vibrations being above a threshold vibrational level within a time threshold of the increased vibrations.

8. The method of claim 1, wherein the amount of vehicle chassis vibration is measured based on a fuel slosh in a fuel tank that provides fuel to the engine, where a level of fuel slosh is indicated via a fuel level sensor.

9. The method of claim 1, wherein the amount of vehicle chassis vibration is measured based on signals received by one or more vibrational sensors coupled to a vehicle suspension system.

10. The method of claim 1, further comprising:
commanding or maintaining application of one or more wheel brakes for one or more wheels of the vehicle,
commanding or maintaining engaged an electronic parking brake for one or more wheels of the vehicle, and
maintaining a vehicle transmission configurable to at least a park mode, a drive mode, and a reverse mode, in a drive mode of operation.

11. The method of claim 1, wherein the adjusting includes adjusting while the engine is idling.

12. The method of claim 1, wherein the vehicle is a hybrid vehicle.

13. A method, comprising:
propelling an autonomous vehicle at least in part via an engine;
isolating engine vibration from a vehicle chassis via one or more active engine mounts controllable to at least a dampening mode and a stiffening mode; and
commencing an active engine mount diagnostic test based on predetermined conditions including one or more of an engine idle condition, a duration of time elapsing since a prior active engine mount diagnostic test, a fuel level in a fuel tank between ten percent and ninety percent of a capacity of the fuel tank, an indication of a remote engine start event; and/or an indication that the vehicle is not occupied;

during the active engine mount diagnostic test, actively inducing vehicle vibrations via spinning an engine unfueled using torque from a motor while selectively deactivating valves of engine cylinders, or via shutting off fueling to a preselected engine cylinder to induce degraded combustion in the preselected engine cylinder;

during the active engine mount diagnostic test, adjusting one or more active engine mounts to the dampening mode, followed by the stiffening mode, and then returning to the dampening mode while actively inducing vehicle vibrations; and indicating whether the active engine mounts are functioning as desired, are stuck in the dampening mode, or are stuck in the stiffening mode, based on a plurality of fuel slosh events in the fuel tank resulting from both the engine spinning while selectively deactivating valves of the engine cylinders and the degraded combustion.

14. The method of claim 13, further comprising:

monitoring vehicle chassis vibration via one or more vibrational sensors while the active engine mounts are adjusted to the dampening and stiffening modes, and where the monitored vibrations include vibrations due to the induced vehicle vibrations via deactivating and reactivating one or more valves of the engine cylinders.

15. The method of claim 13, wherein indicating whether the active engine mounts are functioning as desired include monitoring vibration being dampened below a vibration threshold during each of the dampening modes and monitoring vibration being above the vibration threshold during each of the stiffening modes.

16. A vehicle system comprising:

an engine including one or more cylinders;

an electric motor device coupled to a battery;

a transmission coupled to at least the engine;

one or more active engine mounts configured to isolate engine vibrations from a vehicle chassis;

one or more vibrational sensors configured to monitor vehicle chassis vibration; and a controller with computer readable instructions stored on non-transitory memory for:

when the engine is in an idling condition, inducing vehicle vibrations via spinning the engine unfueled using the electric motor device while selectively deactivating one or more valves of the one or more cylinders;

while inducing the vibrations, adjusting the active engine mounts to a first, dampening mode for a first predetermined duration, followed by a second, stiffening mode for a second predetermined duration, and then returning to the first, dampening mode for a third predetermined duration during the inducing;

monitoring an amount of vehicle chassis vibration during the adjusting; and indicating active engine mount degradation based on the monitored amount of chassis vibration in each operating mode.

17. The system of claim 16, wherein the one or more vibrational sensors configured to monitor vehicle chassis vibration includes one or more of the following:

a fuel level sensor configured to monitor a level of fuel slosh in a fuel tank that provides fuel to the engine; and a vibrational sensor coupled to a suspension system of the vehicle.

18. The system of claim 16, further comprising:

an antilock brake system for increasing or decreasing hydraulic pressure to one or more vehicle wheel brakes; and a parking brake system for providing variable braking force on a wheel;

wherein the controller further stores instructions for:

commanding the transmission to a drive mode of operation;

commanding or maintaining application of the one or more vehicle wheel brakes; and commanding the parking brake system to provide full braking force.

19. The system of claim 16, wherein the controller further stores instructions in non-transitory memory that, when executed, cause the controller to:

indicate that the one or more active engine mounts are stuck in the first, dampening mode responsive to vehicle vibrations as monitored via the one or more vibrational sensors when the vibration during each of the first, second, and third predetermined durations is less than a threshold.

20. The system of claim 19, wherein the controller further stores instructions in non-transitory memory that, when executed, cause the controller to:

indicate that the active engine mounts are stuck in the second, stiffening mode responsive to vibrations as monitored via the one or more vibrational sensors when the vibration during each of the first, second, and third predetermined durations is higher than the threshold.

* * * * *